United States Patent Office 3,001,189
Patented Sept. 19, 1961

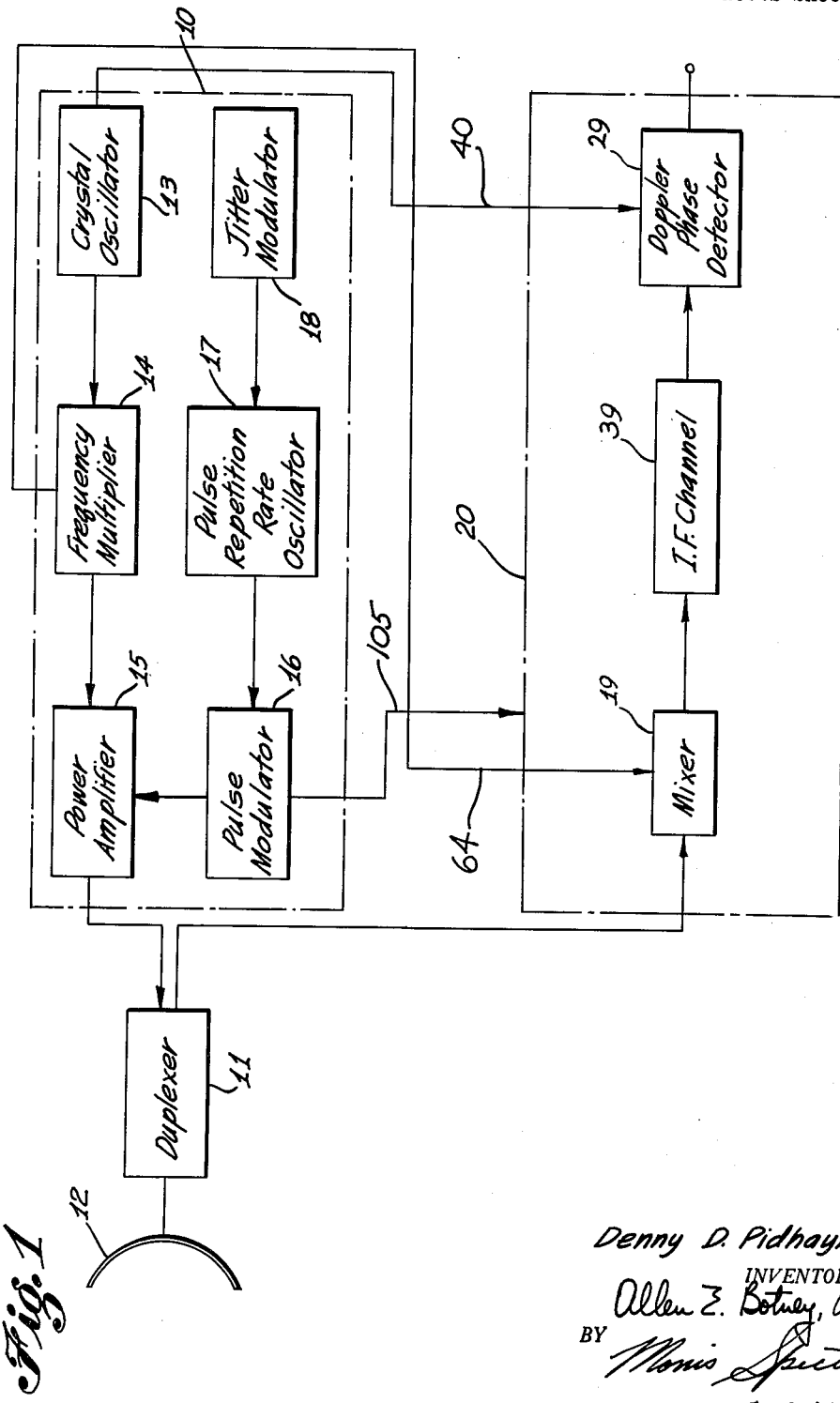

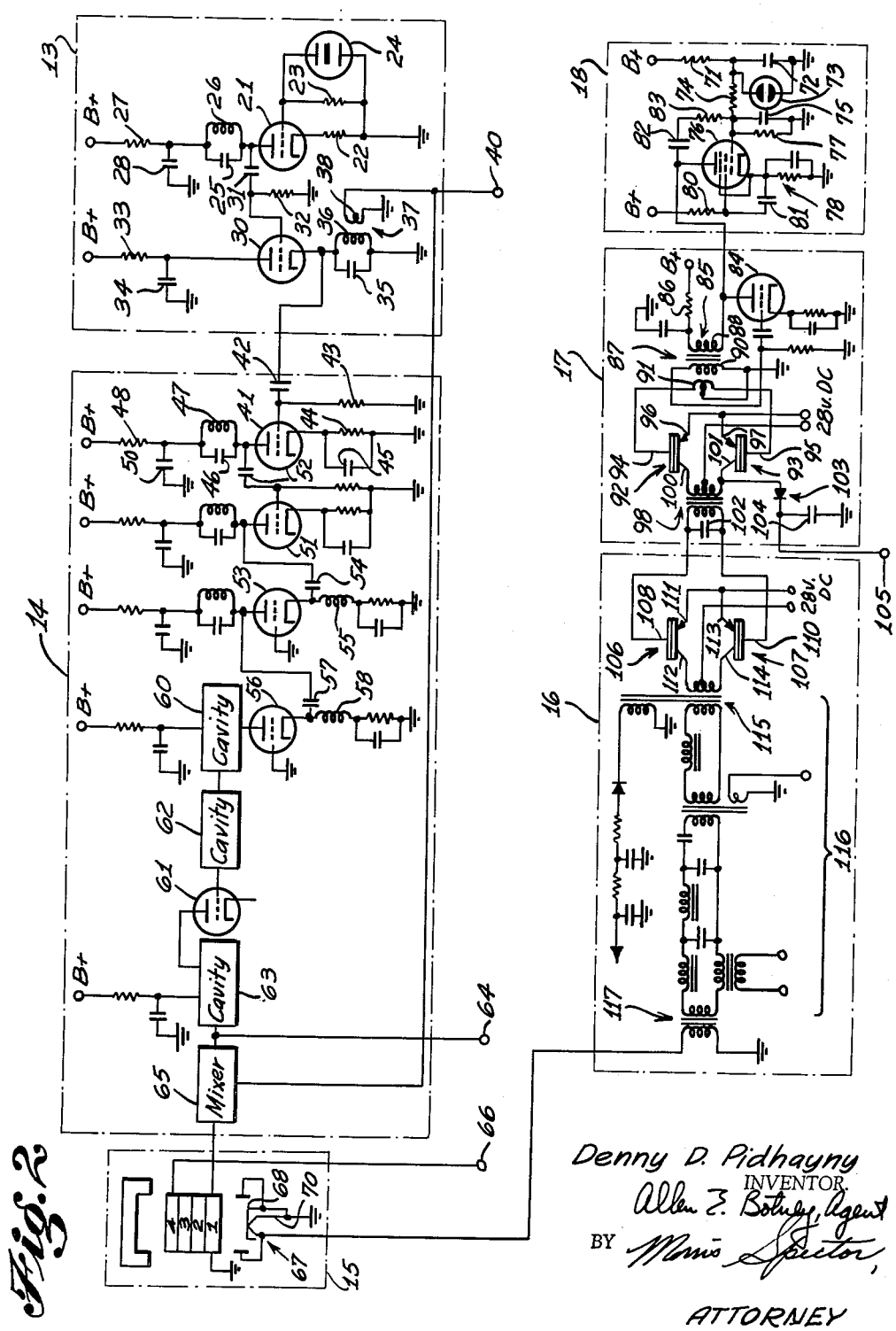

3,001,189
DOPPLER RADAR TRANSMITTER
Denny D. Pidhayny, Los Angeles, Calif., assignor, by mesne assignments, to Thompson Ramo Wooldridge Inc., Cleveland, Ohio, a corporation of Ohio
Original application May 28, 1956, Ser. No. 587,768. Divided and this application Dec. 26, 1957, Ser. No. 705,247
13 Claims. (Cl. 343—8)

The present invention relates in general to radar transmitters and more particularly to a radar transmitter capable of generating signals at an extremely stable frequency.

The transmitter of the present invention is shown and described in copending U.S. Patent application Serial No. 587,768 for a Collision Indication System, by Emory Lakatos, Denny D. Pidhayny and Millard F. Gordon, filed May 28, 1956. Accordingly, this application is a division of the above-mentioned original application and for which the earlier filing date is claimed.

A Doppler radar system basically operates on the principle that a shift will occur in the carrier frequency of the transmitted signals when these signals are reflected from a target that is either approaching or moving away from the system. The amount of frequency shift may contain a variety of information, such as the relative velocity between the target and the system, and is usually measured by heterodyning the returned signal in the receiver against a locally generated signal having the carrier frequency. For convenience, the difference frequency extracted by means of the heterodyning process is conventionally referred to as the Doppler frequency.

Under some circumstances as, for example, where the relative velocity is small, the Doppler frequency may be quite small, perhaps only a few cycles per second. Accordingly, it will be obvious that unless the frequencies of the signals generated by the system are quite stable, high percentage errors may result.

Frequency instability has been a prime source of difficulty in prior types of radar systems. One reason for this has been the fact that two different sources of the carrier frequency were employed, one in the transmitter for purposes of transmission and the other in the receiver for the heterodyning operation mentioned above. Those skilled in the art will recognize at once the great difficulty involved in at all times maintaining two such sources at exactly the same frequency.

Another reason for instability and error in the past has been due to the relatively high interelectrode capacitances and transient times of the tubes employed in the transmitter as well as to the drifts in frequency caused by variations in the operating characteristics of these tubes which may, for example, be occasioned by the aging of the tubes.

A still further disadvantage of earlier types of radar systems is that they are highly susceptible to interference from other systems transmitting signals at substantially the same carrier frequency and pulse repetition rate. Where this type of interference exists, it is often impossible to extract the desired information.

It is, therefore, an object of the present invention to provide a radar transmitter that may reliably be used in Doppler radar systems.

It is another object of the present invention to provide a radar transmitter that provides reference frequencies for the entire radar system.

It is an additional object of the present invention to provide a radar transmitter that is capable of generating an extremely stable carrier frequency.

A further object of the present invention is to provide a radar transmitter that guards against interference from other such transmitters operating at substantially the same carrier frequency and pulse repetition rate.

The limitations and disadvantages encountered in prior art radar transmitters may be overcome and the objects enumerated above may be achieved by employing highly efficient tubes, utilizing a single source for the signals basic to the system and by varying the pulse repetition rate of the transmitted signals in a prescribed manner.

More particularly, according to an embodiment of the present invention, a signal is generated at a basic reference frequency which is then multiplied a predetermined number of times to produce a continuous-wave signal having the desired carrier frequency. This latter signal is then amplitude-modulated by a train of pulses whose pulse repetition rate is made to vary in a prescribed manner from a mean pulse repetition rate, thereby producing a train of pulsed carrier signals for transmission at a varying repetition rate, as mentioned earlier.

The signal generated at the basic reference frequency and the multiplied signal are both directly applied to the receiver portion of the radar system and used directly therein for heterodyning either the echo signals or the signals derived therefrom. Thus, by using a common source for the required transmitter and receiver signals, a major obstacle to system stability is eliminated. The stability of the transmitter and, therefore, of the system is further enhanced through the use of 5670 and GL6442 type tubes which are highly efficient and relatively small in size. Thus, interelectrode capacitances and transient times are diminutive. Furthermore, these tubes are long-life tubes, with the result that the undesirable aging characteristics of ordinary tubes are substantially eliminated.

The novel features which are believed to be characteristic of the invention, both as to its organization and method of operation, together with further objects and advantages thereof, will be better understood from the following description considered in connection with the accompanying drawings in which an embodiment of the invention is illustrated by way of example.

FIGURE 1 is a block diagram of a radar system and shows the basic elements of an embodiment of the present invention, namely, the transmitter and receiver.

FIGURE 2 is a schematic representation of the embodiment of FIGURE 1 and illustrates a preferred construction of the transmitter.

Referring now to the drawings, there is shown in FIGURE 1 a radar transmitter according to the present invention, the transmitter as a whole being designated 10. As shown in the figure, the transmitter is connected through a duplexer 11 to an antenna array which, for purposes of convenience, is lumped together and presented as a single antenna 12. The antenna array is preferably of the type that will omnidirectionally radiate the radar pulses into space.

Transmitter 10 includes a crystal oscillator 13 which generates a very stable signal at a basic reference frequency. In the embodiment of this invention, the frequency of the oscillator signal is 60 megacycles. Oscillator 13 has two output terminals, the first of which is connected to a frequency multiplier circuit 14 which increases the frequency of the oscillator signal to some predetermined higher value. In the present case, the oscillator signal is multiplied upward a number of times from 60 megacycles to a 2940 megacycle signal.

The output end of multiplier circuit 14 is connected to one of two input terminals of a power amplifier 15 which also performs as a modulator, the other input terminal of the power amplifier being connected to the first of two output terminals from a pulse modulator circuit 16. The modulator circuit generates a train of pulses that is used to modulate the 2940 megacycle continuous-wave signal applied to amplifier 15 by frequency multiplier 14.

The pulse repetition rate of the pulse train is determined by a pulse repetition rate oscillator 17 connected to pulse generator 16 and, in the embodiment being described, the pulse repetition date is derived from a 20 kilocycle signal generated by oscillator 17. Consequently, the basic pulse repeition rate is 20 kilocycles. However, for reasons previously mentioned, the pulse repetition rate is varied in a prescribed manner from 20 kilocycles and this is accomplished by a jitter modulator circuit 18 connected to oscillator 17.

The output end of amplifier 15 is also the transmitting end of transmitter 10. Accordingly, whatever signals are produced by amplifier 15 are applied through duplexer 11 to antenna array 12. Other output ends of the transmitter, namely, the second output terminals of frequency multiplier 14, pulse modulator 16 and oscillator 13, are connected to a radar receiver 20, as shown in the figure. More specifically, the second output terminal of multiplier 14 is connected directly to a mixer circuit 19 and the second output terminal of oscillator 13 is connected directly to a Doppler phase detector 29, the second output terminal of modulator 16 being connected to a range gate maker network which is not pertinent to the invention and, therefore, is not shown. Between mixer 19 and detector 29 there is connected an intermediate-frequency channel which has been designated 39 in the figure.

Having thus broadly described the embodiment of the present invention, the transmitter will now be delineated with greater particularity. Accordingly, reference is made to FIGURE 2 wherein the basic elements of the transmitter are shown in greater detail.

Oscillator 13 is an electronically coupled type of oscillator and comprises a triode 21 whose cathode and control grid are connected through a pair of resistors 22 and 23, respectively, to ground. Connected in parallel with resistor 23 is a crystal 24 which is contained in a crystal oven (not shown) to minimize the effects of temperature change. The anode or plate of triode 21 is connected directly to one end of a tuned circuit comprising a capacitor 25 and inductor 26 connected in parallel, the tuned circuit being resonant at the frequency for which oscillator 13 was designed. In the present embodiment, oscillator 13 was designed to generate a radio-frequency signal at a frequency of 60 megacycles. Accordingly, capacitor 25 and inductor 26 are tuned to 60 megacycles. The other end of the tuned circuit is connected as shown through a resistor-capacitor filter circuit to a source of positive voltage indicated as B+, the resistor and capacitor of the filter circuit being designated 27 and 28, respectively. The purpose of the filter is to provide a radio-frequency short to ground over the range of frequencies for which oscillator 13 was designed, thereby preventing any feedback to voltage source B+. As mentioned above, oscillator 13 is an electronically coupled oscillator which is a well known type of oscillator in the electronic arts. Accordingly, an explanation as to the theory of its operation is not deemed necessary.

Oscillator 13 also includes a buffer amplifier stage operating at 60 megacycles and which comprises a triode 30 whose control grid is coupled both to the anode of triode 21 through a coupling capacitor 31, and through a resistor 32 to ground. The anode of triode 30 is similarly connected through a radio-frequency filter to B+, the filter circuit in the instant case including a resistor 33 connected between the anode and B+ and a capacitor 34 connected between the anode and ground. The cathode of tube 30 is connected to ground through a tuned circuit which comprises a capacitor 35 connected in parallel with the primary winding 36 of a transformer generally designated 37, the secondary winding 38 being connected between ground and an output terminal 40 which is connected directly to Doppler phase detector 29 of receiver 20.

Frequency multiplier 14 multiplies the frequency of the oscillator signal by a factor of 48 to obtain a frequency of 2880 megacycles which is heterodyned with the 60 megacycle oscillator frequency to provide a final frequency of 2940 megacycles and for doing so includes a plurality of individual multiplier stages which, except for their operating frequencies and other minor differences, are identical. Accordingly, to avoid repetition, only the first multiplier stage will be described in detail, the remaining multiplier stages being described only to the extent necessary to point out the differences between them and the first stage.

The first stage of multiplier circuit 14 is coupled to oscillator 13 and is designed to triple the frequency of the signal produced by the oscillator. Thus, since the frequency of the oscillator signal is 60 megacycles, the signal produced at the output of the first multiplier stage will have a frequency of 180 megacycles. As shown in FIGURE 2, this stage includes a triode 41 whose control grid is coupled to the output of oscillator 13 through a coupling capacitor 42, the control grid end of capacitor 42 being connected through a resistor 43 to ground. A resistor-capacitor filter and bias circuit is connected between the cathode of tube 41 and ground, the resistor and capacitor being connected in parallel and designated 44 and 45, respectively. The values of resistor 44 and capacitor 45 are chosen such that the capacitor is an effective short for the fundamental frequency of 60 megacycles.

Considering now the plate circuit of tube 41, the plate is connected to one end of a tuned circuit comprising a capacitor 46 and an inductor 47 connected in parallel, the tuned circuit being resonant at the frequency of the third harmonic of the signal applied to the first stage. In other words, capacitor 46 and inductor 47 are tuned to a frequency of 180 megacycles. As in the oscillator, a resistance-capacitor filter circuit is connected between the other end of the tuned circuit and the positive voltage source B+ for the purpose of preventing any radio-frequency feedback to the voltage supply. The filter resistor, which is connected between the tuned circuit and the B+ supply, is designated 48 while the filter capacitor, designated 50, is connected between ground and the low voltage end of resistor 48.

The second multiplier stage comprising a triode 51 is coupled to the first multiplier stage by means of a coupling capacitor 52 which is connected between the plate and control grid of tubes 41 and 51, respectively. The second multiplier stage is identical with the first stage with one exception, namely, the second stage is designed to double the frequency of the signal put out by the first stage, that is to say, the second stage is tuned to operate at 360 megacycles rather than 180 megacycles.

The third multiplier stage comprising a triode 53 is similar in most respects to the two preceding stages. However, there are some differences that require explanation. For one thing, the coupling between the second and third stages is effected differently than heretofore. Specifically, the control grid of tube 53 is grounded and coupling is achieved by connecting a coupling capacitor 54 between the plate and cathode of triodes 51 and 53, respectively. For another thing, instead of the cathode of tube 53 being connected directly to a resistor-capacitor by-pass circuit as before, the cathode is coupled to such a by-pass circuit through an inductor element 55 which, together with the stray capacitance that shunts the inductor, is resonant at the frequency of the signal produced by the second multiplier stage, namely 360 megacycles. It will be recognized, therefore, that the third multiplier stage very much resembles a grounded-grid amplifier. In the plate circuit of tube 53, on the other hand, the tank circuit is tuned to 720 megacycles rather than 360 megacycles. Accordingly, this third stage is designed to operate as a frequency doubler.

The fourth multiplier stage comprising a triode 56 is substantially identical to the preceding third stage. Thus, here again, the circuit is of the grounded-grid type, the 720 megacycle signal produced by the third stage being applied through a coupling capacitor 57 to the cathode end of an inductor element 58 which is resonant at 720 megacycles. The fourth stage is also designed to operate as a frequency doubler with the result that the tuned circuit in the plate of tube 56 is resonant at 1440 megacycles. However, because of the relatively high frequency involved, it was found to be preferable to use a resonant cavity 60 instead of the capacitor-inductor type of tuned circuit used in the first three stages.

The fifth and last multiplier stage varies but little from those already described and, hence, for convenience, is shown in simplified diagrammatic form in the figure. As shown, the fifth stage comprises a triode 61 which is coupled to the fourth stage through a resonant cavity 62 which is tuned to 1440 megacycles, the cavity being connected between cavity 60 and the control grid of tube 61. The cathode of tube 61 is connected to the usual resistor-capacitor by-pass circuit (not shown) and the tube plate is connected to a resonant cavity 63 tuned to 2880 megacycles which is twice the frequency of the signal produced by the fourth stage. Hence, this multiplier stage is also operated as a frequency doubler. The output end of cavity 63 is connected to an output terminal 64 which is directly connected to mixer 19 of receiver 20.

Frequency multiplier 14 also includes a mixer circuit 65, one input being connected to cavity 63 of the last multiplier stage and the other input being connected to output terminal 40 of oscillator 13. Mixer circuits are well known in the art so that no further description thereof is deemed necessary. Suffice it to say, therefore, that since mixer 65 beats signals at frequencies of 60 and 2880 megacycles, the output circuit of the mixer is tuned to 2940 megacycles.

It should be emphasized again here that 5670 and GL6442 type triodes are utilized in the oscillator and multiplier circuits, respectively, and that through the use of such tubes a very high degree of frequency stability is achieved so that 60, 2880 and 2940 megacycle signals may be accurately obtained.

Power amplifier 15 is basically a four cavity klystron tube which, when actuated, supplies the power to the antennas. As shown in the figure, the four cavities are designated 1, 2, 3 and 4, cavity 1 being connected to mixer 65 and, therefore, being the input cavity whereas cavity 4 is the output cavity and is connected to an output terminal 66. The electron gun portion of the klystron is generally designated 67, the cathode and cathode heater elements thereof being designated 68 and 70, respectively. Activation of the klystron occurs when a pulse is applied to the cathode element 70 at which time, in accordance with well known principles, an electron beam is formed and passed into the cavities. The various types of klystrons that may be utilized herein are shown and described throughout volume 7 of the M.I.T. Radiation Lab Series entitled Klystrons and Microwave Triodes, by Donald R. Hamilton, Julian K. Knipp and J. B. Horner Kuper, published in 1948 by McGraw-Hill Book Company, Inc.

Jitter modulator 18 basically comprises two circuits, one a sawtooth generator which, as the name implies, produces sawtooth signals, and the other a reactance tube modulator which is used to vary the inductance of a frequency-determining tank of an oscillator for the purpose of producing an FM wave.

The sawtooth generator circuit includes a resistor 71 and a capacitor 72 connected in series between voltage source B+ and ground, one end of resistor 71 being connected to B+ and one end of capacitor 72 being connected to ground. The junction of resistor 71 and capacitor 72 is connected to a neon bulb 73 which is shunted across the capacitor. The aforesaid junction is also the high voltage end of another series connected arrangement of a resistor 74 and a capacitor 75, the junction being connected to one end of resistor 74 and one end of capacitor 75 being grounded.

The reactance tube modulator portion of jitter modulator 18 includes a variable reactance tube 76 which is of the pentode type, the control grid of the pentode being connected through a resistor 77 to ground, the cathode being shorted to the suppressor grid and also connected to ground through a resistor-capacitor by-pass circuit, generally designated 78, the screen grid being connected to the junction of a resistor 80 and capacitor 81, resistor 80 being connected between voltage source B+ and the screen grid and capacitor 81 being connected between the screen grid and by-pass circuit 78, and the pentode plate being connected to one end of a capacitor 82 the other end of which is connected through a resistor 83 to the junction of resistor 74 and capacitor 75.

Pulse repetition rate oscillator 17 comprises a standard type oscillator adjusted to provide a 20 kilocycle signal and a 20 kilocycle magnetic chopper amplifier. The oscillator section includes a triode 84 whose plate element is connected both to the plate element of reactance tube 76 and to one end of a tank circuit, generally designated 85, the other end of which is connected through a resistor 86 to voltage source B+. Thus, reactance tube 76 is shunted across tank circuit 85, which is the customary manner for connecting such a tube to a tank circuit where the object is to vary the resonant frequency of the tank circuit. Inductance for the tank circuit, a suitable amount of feedback to the control grid of tube 84 and coupling between the oscillator and magnetic chopper amplifier sections are provided by means of a three winding transformer, generally designated 87, the primary winding being designated 88, the secondary winding 90 and the third winding 91. The windings are connected as shown.

Winding 91 is center-tapped to ground to provide a balanced input to a pair of either p-n-p or n-p-n junction transistors that are generally designated 92 and 93, one end of winding 91 being connected to the base electrode, designated 94, of transistor 92 and the other end of winding 91 being connected to the base electrode designated 95, of transistor 93. The emitter electrodes of transistors 92 and 93 are designated 96 and 97, respectively, and are connected to one terminal of a 28 volt D.-C. supply, the other supply terminal being connected to the center tap of the primary winding of an output transformer generally designated 98. The collector electrodes of transistors 92 and 93 are designated 100 and 101, respectively, and are connected in a push-pull arrangement to the ends of the primary winding of transformer 98. The secondary winding of transformer 98 constitutes the output for pulse repetition rate oscillator 17 and, as shown in the figure, has a capacitor 102 connected thereacross whose value is such that the secondary winding and the capacitor are resonant at 20 kilocycles.

Oscillator 17 also includes means for providing a 20 kilocycle reference pulse, the means preferably including a crystal diode which is generally designated 103 and a capacitor 104. Specifically, the anode of diode 103 is connected to collector 101 whereas the cathode thereof is connected to a reference output terminal 105. Capacitor 104 is connected between terminal 105 and ground.

Pulse modulator 16 comprises a 20 kilocycle magnetic chopper as well as a transmission line type of pulsing network. The chopper is substantially identical to the one described earlier and, consequently, includes a pair of transistors 106 and 107 whose base electrodes, designated 108 and 110, respectively, are connected to the ends of the secondary winding of output transformer 98. The emitter and collector electrodes of transistor 106 are designated 111 and 112, respectively, and the emitter and collector electrodes of transistor 107 are similarly designated 113 and 114. As before, emitters 111 and 113 are jointed to one terminal of a 28 volt D.-C. supply, the other supply terminal being connected to the center tap of the primary winding of an output transformer which is generally designated 115 in the figure.

The pulse-forming network of modulator 16 is indicated generally by the numeral 116 and serves the dual purpose of storing exactly the amount of energy required for a single pulse and of discharging this energy into the load in the form of a pulse of specified shape. In the present instance, the preferred pulse is of a rectangular shape. An amount of energy equal to that discharged is stored during each interpulse interval. A full discussion of pulse-forming networks of the lumped-constant transmission line type is presented on pages 175 through 224 of volume 6 of the M.I.T. Radiation Laboratory Series entitled "Pulse Generators" by G. N. Glasoe and J. V. Lebacqz, published in 1948 by the McGraw-Hill Book Co., Inc. Suffice it to say, therefore, that network 116 is connected between the secondary winding of transformer 115 and the primary winding of an output pulse transformer, generally designated 117. The secondary winding of transformer 117 is the output end of pulse modulator 16 and is connected between ground and filament 70 in amplifier 15.

In considering the operation, reference is made to FIG. 2 wherein crystal oscillator 13, in a well known manner, genertes a signal at a basic reference of 60 megacycles. The oscillator signal is developed across the tank circuit in the plate circuit of oscillator tube 21 and is coupled therefrom through capacitor 31 to the control grid of buffer amplifier tube 30. As a result, the 60 megacycle signal is produced across the tank circuit in the cathode circuit of tube 30 and is coupled therefrom, by means of transformer 37, to output terminal 40 in consequence of which the oscillator signal is applied directly to phase detector 29 as shown in FIG. 1.

The 60 megacycle signal produced in the buffer amplifier stage of oscillator 13 is applied to the first stage of frequency multiplier network 14. Specifically, the signal is coupled from the cathode of tube 30 through capacitor 42 to the control grid of tube 41. The first stage being a frequency tripler, the frequency of the signal applied thereto is multiplied by a factor of 3 so that the signal produced across the tank circuit in the plate circuit of tube 41 has a frequency of 180 megacycles. This 180 megacycle signal is applied to the four doubler stages which follow the tripler stage wherein the signal is successively doubled until a frequency of 2880 megacycles is attained.

More particularly, the 180 megacycle signal is applied to the control grid of tube 51, a signal at a frequency of 360 megacycles thereby being produced across the tank circuit in the plate circuit of tube 51. The 360 megacycle signal is then coupled through capacitor 54 to the control grid of tube 53 and in consequence thereof, a signal having a frequency of 720 megacycles is produced across the tank circuit in the plate circuit of tube 53. The 720 megacycle signal is next applied through capacitor 57 to the cathode of tube 56 whereat a signal at a frequency of 1440 megacycles is produced in cavity 60. Finally, the 1440 megacycle signal is coupled by means of cavity 62 from cavity 60 to the control grid of tube 61, with the result that a signal at the desired frequency of 2880 megacycles is produced in cavity 63.

The 2880 megacycle signal is applied to output terminal 64 with the result that it is thereby directly applied to mixer 19 of receiver 20. In addition, the 2880 megacycle signal is applied to mixer circuit 65 to which the 60 megacycle signal generated by oscillator 13 is also applied, as is shown in the figure. Mixer circuit 61 beats or heterodynes the 60 megacycle signal against the 2880 megacycle signal to produce a signal whose frequency is equal to the sum of the frequencies of the applied signals, namely 2940 megacycles. The 2940 megacycle signal is the output signal for multiplier network 14 and is, therefore, applied to cavity 1 of the klystron tube in power amplifier 15.

Referring now to jitter modulator 18 in FIG. 2, capacitor 72 therein charges through resistor 71. Consequently, the voltage across the capacitor increases and tends to reach a value of B+. However, at a certain voltage depending upon the characteristics of neon tube 73, the neon tube is triggered to fire and, when this occurs, capacitor 72 is rapidly discharged through the neon tube with the effect that the voltage developed thereacross is just as rapidly reduced to zero. Following discharge, the voltage across capacitor 72 again builds up toward B+ until, for the reason mentioned, discharge again occurs. Thus, a periodic sawtooth voltage is produced across capacitor 72 which is applied through resistor 74 to the control grid of reactance tube 76, the repetition rate of the sawtooth depending upon the parameters of the resistors and capacitors involved and the value of B+.

The sawtooth signal causes the current through tube 76 to vary in accordance with the sawtooth voltage and this, in accordance with well known principles of reactance tube operation, has the effect of periodically varying in a prescribed manner the inductive reactance of the tank circuit in the plate circuit of tube 84 in pulse repetition rate oscillator 17. As a result, the tuning of the tank circuit is correspondingly varied, which means that the frequency of the audio signal, which is normally generated by the oscillator at 20 kilocycles, is also varied in a prescribed manner over a relatively small range of frequencies, 20 kilocycles preferably being the mean frequency. For sustaining the audio oscillations, feedback is provided to the control grid of tube 84 through secondary winding 90.

The frequency varying audio signal is applied in push-pull to transistors 92 and 93 whereat the positive and negative loops of the audio signal are clipped to produce a square-wave signal across the primary winding of output transformer 98. This square-wave signal is used to provide reference pulses at output terminal 105, which applies the pulses to receiver 20. In the present case, due to the particular connections of diode 103, the diode is back-biased as to the negative portions of the square-wave signal. Thus, the reference pulses produced at terminal 105 are positive.

The square-wave signal is also fed to the secondary winding of transformer 98 which is tuned by capacitor 102 to approximately 20 kilocycles. Accordingly, the square-wave signal is converted back to a frequency varying audio signal that is substantially sinusoidal in shape. The reason for tuning at this point is to prevent transient voltages from appearing with and altering characteristics of the desired square-wave output.

The reproduced audio signal is now applied to transistors 106 and 107 whereat the half cycles of the signal are again clipped to produce another square-wave signal. This latter square-wave signal is produced across the primary winding of output transformer 15 and is applied through the transformer to pulse-forming network 116 which, in a well-known manner, "washes out" the positive portions of the square-wave signal to produce a train of negative pulses at the secondary winding of output transformer 117. This train of negative pulses is applied to element 70 in power amplifier 15 and, in consequence thereof, the klystron tube therein is successively actuated to generate a train of pulse-modulated-radio-frequency signals, having a frequency of 2940 megacycles, at output terminal 66. In other words, in response to the negative pulse train, the klystron produces a corresponding train of pulsed-carrier signals such that the time-spacing between the signals is not equal but, rather, varies in accordance with the frequency variations of the audio signal which, it will be remembered, was caused to vary by the sawtooth signal generated in jitter modulator 18. The pulsed-carrier signals are coupled through duplexer 11 to antenna array 12 whereat the signals are radiated into space.

Those pulsed-carrier signals striking a target and reflected therefrom are usually referred to as echo signals. In the present case, echo signals are received by mixer 19 wherein they are directly mixed or heterodyned against the 2880 megacycle signal which, it will be recalled, is applied directly to the mixer. The intermediate-frequency signal produced by mixer 19 as a result of the heterodyning process has a frequency that is equal to the difference between the frequency of the pulsed-carrier signals plus or minus the Doppler frequency and the 2880 megacycle signal, that is to say, the frequency of the mixer output signal is 60 megacycles plus or minus the Doppler frequency. This intermediate-frequency signal is applied through intermediate-frequency channel 39, wherein the signal is amplified, to Doppler phase detector 29 which heterodynes the intermediate-frequency signal against the 60 megacycle signal produced by oscillator 13 and applied directly to the detector. The output of detector 29 is a bi-polar video pulse train, the envelope of which is the Doppler signal.

Having thus described the invention, what is claimed is:

1. In a Doppler radar system wherein received echo signals are heterodyned in a receiver against reference signals to produce a Doppler frequency signal indicative of moving objects, a radar transmitter for producing reference signals capable of being applied directly to the above-said receiver, said transmitter comprising: oscillator means for generating a first signal at a highly stable predetermined frequency; and frequency-multiplier means receptive of said first signal and operable in response thereto to produce a second signal at a highly stable frequency a predetermined number of times higher than the frequency of said first signal, said second signal being utilized to transmit signals toward objects and also being directly applied to the receiver for direct heterodyning therein with the received echo signals to produce an intermediate-frequency Doppler signal against which said first signal is directly heterodyned to produce a Doppler frequency signal indicative of a moving object.

2. In a Doppler radar system wherein received echo signals are heterodyned in a receiver against reference signals to produce a Doppler frequency signal indicative of moving objects, a radar transmitter for producing reference signals capable of being applied directly to the above-said receiver, said transmitter comprising: oscillator means for generating a first signal at a highly stable first predetermined frequency; and frequency-multiplier means receptive of said first signal and operable in response thereto to produce second and third signals at highly stable second and third predetermined frequencies, respectively, the difference between said second and third frequencies being equal to said first frequency, said third signal being transmitted toward objects and said second signal being directly applied to the receiver for direct heterodyning therein with received echo signals to produce an intermediate-frequency Doppler signal against which said first signal is directly heterodyned to produce a Doppler frequency signal indicative of a moving object.

3. The transmitter defined in claim 2 wherein said frequency-multiplier means includes a frequency-tripler circuit response to said first signal for producing a highly stable first harmonic signal at a frequency equal to three times said first frequency; a plurality of four frequency-doubler circuits connected in tandem and operable in response to said first harmonic signal to produce said second signal at a frequency equal to forty-eight times said first frequency; and a mixer circuit for heterodyning said first signal against said second signal to produce said third signal at a frequency equal to forty-nine times said first frequency.

4. In a Doppler radar system wherein received echo signals are heterodyned in a receiver against reference signals to produce a Doppler frequency signal indicative of moving objects, a radar transmitter for producing reference signals capable of being applied directly to the above-said receiver, said transmitter comprising: oscillator means for generating a first signal at a highly stable predetermined frequency; frequency-multiplier means receptive of said first signal and operable in response thereto to produce second and third signals at highly stable second and third frequencies, respectively, each frequency respectively, being a predetermined number of times higher than the frequency of said first signal, said second signal being directly applied to the receiver for direct heterodyning therein with received echo signals to produce an intermediate-frequency Doppler signal against which said first signal is directly heterodyned to produce a Doppler frequency signal indicative of a moving object; drive means for producing a train of pulses having a prescribed pulse repetition rate; and transmitter output means responsive to said pulse train for radiating said third signal into space toward objects for the duration of each pulse thereof, thereby to radiate a corresponding train of pulsed-carrier signals at said third frequency, the received echo signals being the radiated pulsed-carrier signals reflected from a target.

5. The transmitter defined in claim 4 wherein said transmitter further includes means for varying the pulse repetition rate of said pulse train in a prescribed manner, whereby the pulse repetition rate of said pulsed-carrier signals is similarly varied.

6. In a Doppler radar system wherein received echo signals are heterodyned in a receiver against reference signals to produce a Doppler frequency signal indicative of moving objects, a radar transmitter for producing reference signals capable of being applied directly to the receiver, said transmitter comprising: means for generating square-wave signals at a rate that varies in a prescribed manner; a pulse-forming network for converting said square wave signals to a train of pulses having a pulse repetition frequency that varies in said prescribed manner; an oscillator including means for generating a first signal at a highly stable first predetermined frequency; a frequency-multiplier network receptive of said first signal and operable in response thereto to produce second and third signals at highly stable second and third predetermined frequencies, respectively, said second signal being directly applied to the receiver for direct heterodyning therein with received echo signals to produce an intermediate-frequency Doppler signal which said first signal is directly heterodyned to produce a Doppler frequency signal indicative of a moving object; and modulator means responsive to said pulse train for pulse modulating said third signal to produce a corresponding train of pulsed-carrier signals that are subsequently radiated into space toward the objects, the received echo signals being those of the radiated signals that are reflected from an object.

7. The transmitter defined in claim 6 wherein said frequency-multiplier network includes a frequency-tripler circuit responsive to said first signal for producing a highly stable first harmonic signal at a frequency equal to three times said first frequency; a plurality of four frequency-doubler circuits connected in tandem and operable in response to said first harmonic signal to produce said second signal at a frequency equal to forty-eight times said first frequency; and a mixer circuit for heterodyning said first and second signals to produce said third signal at a frequency equal to forty-nine times said first frequency.

8. The Doppler radar transmitter defined in claim 6 wherein said square-wave means includes a sweep generator for generating an audio signal that is frequency-modulated in a prescribed manner; and a square-wave generator responsive to said audio signal for generating square-wave signals at a rate that varies in said prescribed manner.

9. The transmitter defined in claim 8 wherein said sweep generator includes means for generating sawtooth signals; and an audio oscillator adapted to produce an audio signal whose frequency varies in accordance with the amplitude of said sawtooth signals applied thereto.

10. A Doppler radar system wherein received echo signals are heterodyned against reference signals to produce a Doppler frequency signal indicative of moving objects, said system comprising: a transmitter for generating first, second and third signals at highly stable first, second and third predetermined frequencies, respectively, the difference between said second and third frequencies being equal to said first frequency, said third signals being transmitted into space toward objects, the received echo signals being those of the transmitted third signals reflected from an object; and a receiver for successively heterodyning the received echo signals directly against said second and first signals applied directly thereto to produce a Doppler frequency signal indicative of a moving object.

11. A Doppler radar system wherein received echo signals are heterodyned against reference signals to produce a Doppler frequency signal indicative of moving objects, said system comprising: oscillator means for generating a first signal at a highly stable predetermined frequency; frequency-multiplier means receptive of said first signal and operable in response thereto to produce a second signal at a highly stable frequency a predetermined number of times higher than the frequency of said first signal, said second signal being utilized to transmit signals toward objects; mixer means for directly heterodyning said second signal directly applied thereto against the echo signals to produce an intermediate-frequency Doppler signal whose frequency differs from the frequency of said first signal by the amount of the Doppler frequency; and detector means for directly mixing said first signal directly applied thereto with said intermediate-frequency Doppler signal to produce the Doppler signal.

12. A Doppler radar system wherein received echo signals are heterodyned against reference signals to produce a Doppler frequency signal indicative of moving objects, said system comprising: oscillator means for generating a first signal at a highly stable first predetermined frequency; frequency-multiplier means receptive of said first signal and operable in response thereto to produce second and third signals at highly stable second and third predetermined frequencies, the difference between said second and third frequencies being equal to said first frequency; drive means for producing a train of pulses having a prescribed pulse repetition rate; and transmitter output means responsive to said pulse train for radiating said third signal into space for the duration of each pulse thereof, thereby to radiate a corresponding train of pulsed-carrier signals at said third frequency, the echo signals being those of the radiated signals that are reflected from an object; mixer means for directly heterodyning said second signal directly applied thereto against received echo signals to produce an intermediate-frequency Doppler signal whose frequency differs from the frequency of said first signal by the amount of the Doppler frequency; and detector means for directly mixing said first signal directly applied thereto with said intermediate-frequency Doppler signal to produce the Doppler signal.

13. A Doppler radar system wherein received echo signals are heterodyned against reference signals to produce a Doppler frequency signal indicative of moving objects, said system comprising: an oscillator for generating a first signal at a highly stable first predetermined frequency; a frequency-tripler circuit responsive to said first signal for producing a highly stable first harmonic signal at a frequency equal to three times said first frequency; a plurality of four frequency-doubler circuits connected in tandem and operable in response to said first harmonic signal to produce a highly stable second signal at a frequency equal to forty-eight times said first frequency; a mixer circuit for heterodyning said first and third signals to produce a third signal at a frequency equal to forty-nine times said first frequency; means for generating sawtooth signals; an audio oscillator adapted to produce an audio signal whose frequency varies in accordance with the amplitude of said sawtooth signals applied thereto; a square-wave generator responsive to said audio signal for producing square-wave signals at a rate that varies as the frequency of said audio signal; a pulse-forming network for converting said square-wave signals to a train of pulses having a pulse repetition frequency that varies as the frequency of said audio signal; modulator means responsive to said pulse train for pulse modulating said third signal to produce a corresponding train of pulsed-carrier signals that are radiated into space, the echo signals being those of the radiated signals that are reflected from an object; mixer means for directly heterodyning said second signal directly applied thereto against the echo signals to produce an intermediate-frequency Doppler signal whose frequency differs from the frequency of said first signal by the amount of the Doppler frequency; and detector means for directly mixing said first signal directly applied thereto with said intermediate-frequency Doppler signal to produce the Doppler signal.

References Cited in the file of this patent

UNITED STATES PATENTS

| | | |
|---|---|---|
| 2,677,126 | Webb | Apr. 27, 1954 |
| 2,695,404 | Barker | Nov. 23, 1954 |
| 2,840,808 | Woodward | June 24, 1958 |